United States Patent
Wiley et al.

(10) Patent No.: US 7,213,519 B2
(45) Date of Patent: May 8, 2007

(54) COMPOSITE POLYMER BASED CARTRIDGE CASE HAVING AN OVERMOLDED METAL CUP, POLYMER PLUG BASE ASSEMBLY

(75) Inventors: Sy Wiley, Minden, LA (US); William E. Rembert, III, Minden, LA (US); Gary Loftin, Minden, LA (US)

(73) Assignee: Polytech Ammunition Company, Minden, LA (US)

( * ) Notice: Subject to any disclaimer, the term of this patent is extended or adjusted under 35 U.S.C. 154(b) by 31 days.

(21) Appl. No.: 11/256,687

(22) Filed: Oct. 24, 2005

(65) Prior Publication Data

US 2006/0075919 A1 Apr. 13, 2006

Related U.S. Application Data

(63) Continuation-in-part of application No. 10/695,158, filed on Oct. 29, 2003, now abandoned.

(60) Provisional application No. 60/421,782, filed on Oct. 29, 2002.

(51) Int. Cl.
 *F42B 5/307* (2006.01)
(52) U.S. Cl. .................. 102/467; 102/464; 86/18
(58) Field of Classification Search .............. 102/430, 102/439, 464–467; 86/10, 18
See application file for complete search history.

(56) References Cited

U.S. PATENT DOCUMENTS

| | | | | |
|---|---|---|---|---|
| 2,918,868 A | * | 12/1959 | Ringdal | 102/530 |
| 3,659,528 A | * | 5/1972 | Santala | 102/468 |
| 3,797,396 A | * | 3/1974 | Reed | 102/468 |
| 3,842,739 A | * | 10/1974 | Scanlon et al. | 102/467 |
| 4,187,271 A | * | 2/1980 | Rolston et al. | 264/258 |
| 4,726,296 A | * | 2/1988 | Leshner et al. | 102/467 |
| 4,809,612 A | | 3/1989 | Ballreich et al. | |

(Continued)

FOREIGN PATENT DOCUMENTS

WO 88/09476 12/1988

(Continued)

OTHER PUBLICATIONS

"Green Army bullets to get the lead out" Andrea Stone; USA Today.

(Continued)

*Primary Examiner*—Michael J. Carone
*Assistant Examiner*—Bret Hayes
(74) *Attorney, Agent, or Firm*—Arent Fox LLP

(57) ABSTRACT

A cup and plug assembly of a base for a polymer based ammunition cartridge case body includes a cylindrical sleeve joined to the base. The base includes a plug molded over a cup. The cup includes a first annular cup portion extending in a first direction from a web formed therein and a second annular cup portion extending in a second direction from the web opposite to the first direction. The plug having a first annular portion that completely encompasses an outer circumferential surface of the cup and a second annular portion that extends from the first annular portion. The second annular portion of the plug completely covering an inner surface of the first annular cup portion of the cup. The cup preferably being formed from a metal or a suitable non-metal and the plug being formed from a suitable polymer that is injection molded over the cup.

14 Claims, 17 Drawing Sheets

U.S. PATENT DOCUMENTS

| | | | | |
|---|---|---|---|---|
| 5,033,386 A | * | 7/1991 | Vatsvog | 102/467 |
| 5,259,288 A | | 11/1993 | Vatsvog | |
| 5,563,365 A | * | 10/1996 | Dineen et al. | 102/431 |
| 5,616,642 A | | 4/1997 | West et al. | |
| 5,708,231 A | | 1/1998 | Koon | |
| 5,969,288 A | * | 10/1999 | Baud | 102/466 |
| 6,048,379 A | | 4/2000 | Bray et al. | |
| 6,101,949 A | | 8/2000 | Maucourt et al. | |
| 6,131,519 A | * | 10/2000 | Thiesen et al. | 102/469 |
| 6,257,149 B1 | | 7/2001 | Cesaroni | |
| 6,439,123 B1 | * | 8/2002 | Dionne et al. | 102/430 |
| 6,539,874 B2 | * | 4/2003 | Weise | 102/472 |
| 6,845,716 B2 | | 1/2005 | Husseini et al. | |

OTHER PUBLICATIONS

Environmental Update; Update Index/News Room/ PAO Fall 1999 Army Produces Green Bullets.

U.S. Military "Green Bullet" A Technical Report Association of Firearm and Tool Mark Examiners Journal, vol. 31 No. 4, Fall 1999. Don Mikko.

http://plastics.about.com/library/glossary, Subject: Nylon, 3 pages.

http://plastics.about.com/library/glossary, Subject: Nylon Fiber, 3 pages.

http://plastics.about.com/library/glossary, Subject: Polyhexamethylene-Adipamide, 3 pages.

A.L. Hyde Company, Nylon, 1 page.

http://www.export911.com/ref, General References, Registered Brand Names of Plastics, 4 pages.

Terminology, BISFA 2000, 1.3 Generic classification of synthetic fibres.

\* cited by examiner

Fig. 12

| Reference Ammunition Specification | | | | LOAD Development | | | | |
|---|---|---|---|---|---|---|---|---|
| | | | | Powder | Lot Number | CHG/WT | VEL. | PRESS. |
| | | | Federal | | | | | |
| 110 grain | | | | Accurate #2 | 102002/ST801 | 4.3 grains | | |
| NO-1 | PD38HS3 | 1134 | 15900 | Bullseye-84 | | | 1004 | 17800 |
| NO-2 | | | | | | | 987 | 15900 |
| NO-3 | | | | | | | 979 | 16600 |
| NO-4 | | | | | | | 994 | 16600 |
| NO-5 | | | | | | | 956 | 15600 |
| NO-6 | | | | | | | 973 | 15400 |
| NO-7 | | | | | | | 941 | 14200 |
| NO-8 | | | | | | | 958 | 15900 |
| NO-9 | | | | | | | 971 | 16600 |
| NO-10 | | | | | | | 949 | 15100 |
| AVG VELOCITY | | | | | | | 971 | |
| AVG PRESSURE | | | | | | | | 15970 |
| Extreme Spread | | | | | | | | 63 |
| Standard Deviation | | | | | | | | 20 |
| 110 grain | | | | Accurate #2 | 102002/ST801 | 4.5 grains | | |
| NO-1 | PD38HS3 | 1116 | 14200 | Bullseye-84 | | | 998 | 16300 |
| NO-2 | | | | | | | 989 | 16500 |
| NO-3 | | | | | | | 998 | 15900 |
| NO-4 | | | | | | | 976 | 15400 |
| NO-5 | | | | | | | 1002 | 17800 |
| NO-6 | | | | | | | 993 | 15100 |
| NO-7 | | | | | | | 999 | 15100 |
| NO-8 | | | | | | | 1015 | 17600 |
| NO-9 | | | | | | | 1023 | 17800 |
| NO-10 | | | | | | | 1004 | 17300 |
| AVG VELOCITY | | | | | | | 1000 | |
| AVG PRESSURE | | | | | | | | 16490 |
| Extreme Spread | | | | | | | | 45 |
| Standard Deviation | | | | | | | | 12 |

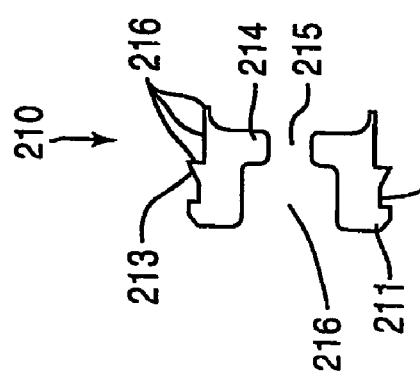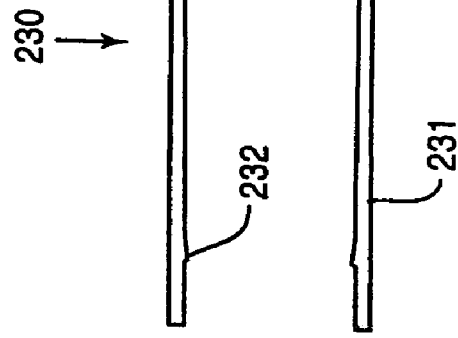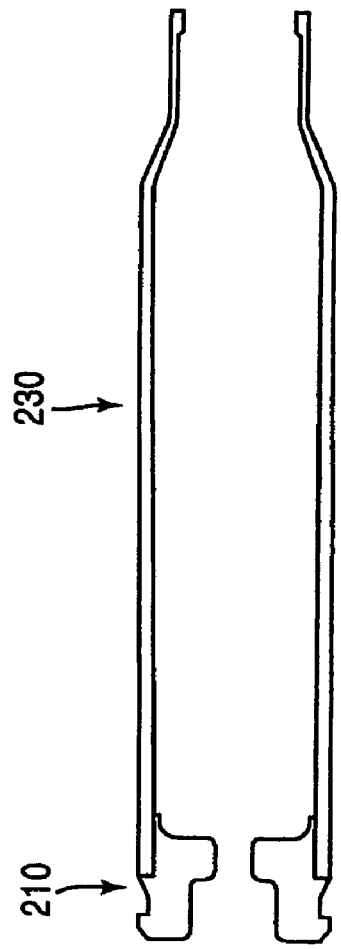

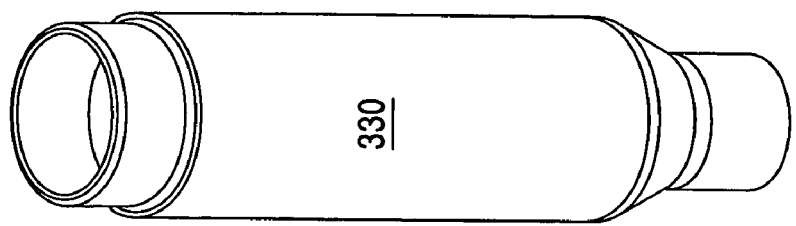
Fig.17A
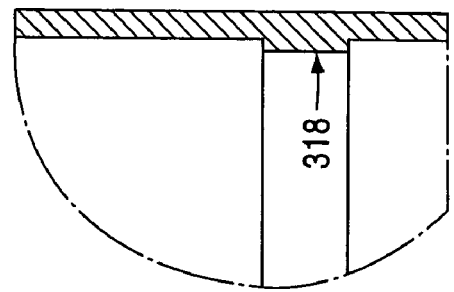
Fig.17D
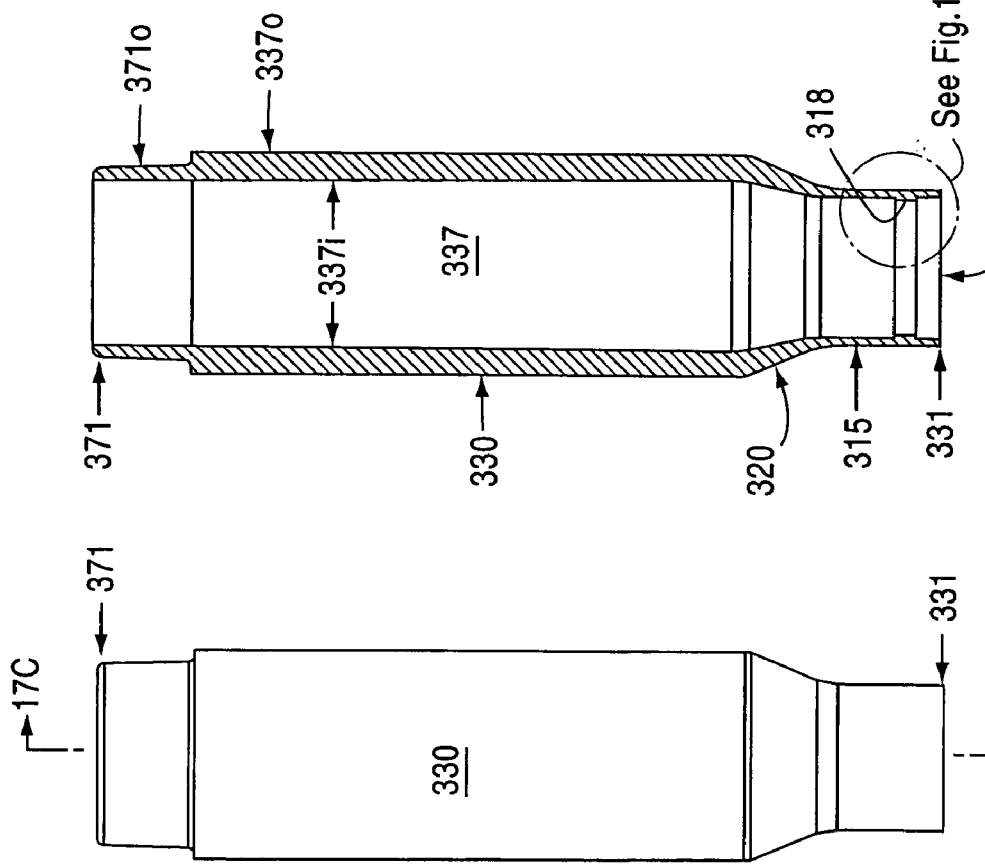
Fig.17C
Fig.17B

COMPOSITE POLYMER BASED CARTRIDGE CASE HAVING AN OVERMOLDED METAL CUP, POLYMER PLUG BASE ASSEMBLY

CROSS-REFERENCE TO RELATED APPLICATION

This application is a continuation-in-part of Applicant's Non-Provisional Application Ser. No. 10/695,158, filed Oct. 29, 2003 now abandoned, the subject matter of which is incorporated herein in its entirety, and claims the benefit of U.S. Provisional Application No. 60/421,782, filed Oct. 29, 2002, the subject matter of which is incorporated herein in its entirety.

BACKGROUND OF THE INVENTION

1. Field of the Invention

The present invention relates to bullets/projectiles (hereinafter referred to as bullets) and bottleneck cartridge cases. More particularly, the present invention relates to composite polymer based cartridge cases having a base comprising an over-molded metal cup and polymer plug assembly and a bottleneck sleeve which has an integral projectile locking feature.

2. Description of Related Art

It is well known in the industry to manufacture bullets and corresponding cartridge cases from either brass or steel. Typically, industry design calls for materials that are strong enough to withstand extreme operating pressures and which can be formed into a cartridge case to hold the bullet, while simultaneously resist rupturing during the firing process.

Conventional ammunition typically includes four basic components, that is, the bullet, the cartridge case holding the bullet therein, a propellant used to push the bullet down the barrel at predetermined velocities, and a primer, which provides the spark needed to ignite the powder which sets the bullet in motion down the barrel.

The cartridge case is typically formed from brass and is configured to hold the bullet therein to create a predetermined resistance, which is known in the industry as bullet pull. The cartridge case is also designed to contain the propellant media as well as the primer.

The bullet is configured to fit within an open end or mouth of the cartridge case and conventionally includes a groove (hereinafter referred to as a cannelure) formed in the mid section of the bullet to accept a crimping action imparted to the metallic cartridge case therein. When the crimped portion of the cartridge case holds the bullet by locking into the cannelure, a bullet pull value is provided representing a predetermined tension at which the cartridge case holds the bullet. The bullet pull value, in effect, assists imparting a regulated pressure and velocity to the bullet when the bullet leaves the cartridge case and travels down the barrel of a gun.

Furthermore, the bullet is typically manufactured from a soft material, such as, for example only, lead, wherein the bullet accepts the mouth of the cartridge being crimped to any portion of the bullet to hold the bullet in place in the cartridge case, even though the cartridge case is crimped to the cannelure of the bullet.

The propellant is typically a solid chemical compound in powder form commonly referred to as smokeless powder. Propellants are selected such that when confined within the cartridge case, the propellant burns at a known and predictably rapid rate to produce the desired expanding gases. As discussed above, the expanding gases of the propellant provide the energy force that launches the bullet from the grasp of the cartridge case and propels the bullet down the barrel of the gun at a known and relatively high velocity.

The primer is the smallest of the four basic components used to form conventional ammunition. As discussed above, primers provide the spark needed to ignite the powder that sets the bullet in motion down the barrel. The primer includes a relatively small metal cup containing a priming mixture, foil paper, and relatively small metal post, commonly referred to as an anvil.

When a firing pin of a gun or firearm strikes a casing of the primer, the anvil is crushed to ignite the priming mixture contained in the metal cup of the primer. Typically, the primer mixture is an explosive lead styphnate blended with non-corrosive fuels and oxidizers which burns through a flash hole formed in the rear area of the cartridge case and ignites the propellant stored in the cartridge case. In addition to igniting the propellant, the primer produces an initial pressure to support the burning propellant and seals the rear of the cartridge case to prevent high-pressure gases from escaping rearward. It should be noted that it is well known in the industry to manufacture primers in several different sizes and from different mixtures, each of which affects ignition differently.

The cartridge case, which is typically metallic, acts as a payload delivery vessel and can have several body shapes and head configurations, depending on the caliber of the ammunition. Despite the different body shapes and head configurations, all cartridge cases have a feature used to guide the cartridge case, with a bullet held therein, into the chamber of the gun or firearm.

The primary objective of the cartridge case is to hold the bullet, primer, and propellant therein until the gun is fired. Upon firing of the gun, the cartridge case seals the chamber to prevent the hot gases from escaping the chamber in a rearward direction and harming the shooter. The empty cartridge case is extracted manually or with the assistance of gas or recoil from the chamber once the gun is fired.

There are three common cartridge case designs that are well known in the industry. In particular, a bottleneck cartridge case 10 shown in FIG. 1 is used with rifles. A straight inner walled cartridge case 20 shown in FIG. 2 has inner walls of the cartridge case that are substantially parallel with a longitudinal axis of the case, which is commonly used with pistols. A tapered straight inner walled cartridge case 30 shown in FIG. 3 has inner walls that are oblique or not parallel relative to the longitudinal axis of the case and is commonly used with revolvers.

As shown in FIG. 1, the bottleneck cartridge case 10 has a body 11 formed with a shoulder 12 that tapers into a neck 13 having a mouth at a first end. A primer holding chamber 15 is formed at a second end of the body opposite the first end. A web area 16 separates a main cartridge case holding chamber 17, which contains a propellant, from the primer holding chamber 15, which communicate with each other via a flash hole channel 18 formed in the web area 16. An exterior circumferential region of the rear end of the cartridge case includes an extraction groove 19a and a rim 19b.

As can be seen in FIG. 2, the straight inner walled cartridge case 20 does not include a shoulder that tapers to a neck 23 at the first end of the cartridge case 20. Furthermore, the straight inner walled cartridge case 20 does not have a rim significantly larger than a case diameter $D_{20}$ and is commonly referred to as a rimless case in the industry. Likewise, the tapered straight wall cartridge case 30 shown in FIG. 3A differs from the cartridge case 20 shown in FIG. 2 as it has interior tapered walls and a rim 39b larger than a case diameter $D_{30}$.

FIG. 3B is an enlarged view of a lip lock 32 provided in the vicinity of the mouth 34 of the cartridge case 30. The lip lock 32 includes a first, generally straight portion 32a, which is orthogonal to a longitudinal axis of the case 30; a second, generally straight portion 32b, which is parallel to the longitudinal axis of the case 30 and orthogonal to the first straight portion 32a; and a slanted portion 32c, which is oblique relative to the longitudinal axis of the cartridge case 30 and both straight portions 32a and 32b. The lip lock 32 is used to securely grip a bullet (not shown).

Typically, manufacturers must take as many as twenty three (23) steps to manufacture a brass cartridge case from a rolled strip of brass material. During loading, which is the step where the cartridge case is loaded with the powder and bullet, the brass cartridge case is crimped to the bullet so that the bullet is held therein. It is well understood that crimping is necessary to assist in creating the pressure needed for satisfactory ballistic performance.

Ballistic performance is a set of measurable events resulting from the combination of a particular bullet weight placed over a particular propellant charge to be ignited by a priming method of predetermined size that establishes the pressure build up needed to propel the bullet at a desired velocity.

As shown in the schematic diagram of FIG. 4, case walls 41a and 41b of the brass cartridge cases 40 are typically crimped at a mouth 44 onto the bullet B to hold the bullet B in place. The contact surface is the wall thickness of the brass cartridge case 40 at the point the cartridge case 40 is crimped.

Alternatively, the cartridge case 50 may be tapered from a rear end 51 to the mouth 54, as shown in FIG. 5, so as to create a press fit P at the mouth 54 of the case 50, which causes the bullet B to be held in place over a larger bearing surface.

In yet another alternative, adhesives may be used to hold the cartridge case and bullet assembly together to assist in providing a desired pressure. Some commercial, law enforcement, and military firearms ammunitions are assembled with adhesives to provide an increased pressure where a simple crimping step is not sufficient.

In the late 1990's it was reported that the military would begin the use of so-called green bullets. Supposedly, such green bullets would be made of high-density materials, such as tungsten, mixed with lighter materials, such as tin and zinc. It was also reported that tungsten-nylon cores could be used. However, no specific range of ingredients was ever provided. It should be noted that the green bullets were fabricated with copper jackets. See Mikko, Assoc. of Firearm and Tool Mark Exam. Journ., vol. 31, No. 4, Fall 1999; USA Today, "'Green' Army bullets to get the lead out," and Environmental Update, Fall 1999.

Several patents for green bullets have been issued.

For example, WO 88/09476 to Booth discloses a bullet made of materials having a specific gravity of 3 to 7, a matrix of plastic material, such as nylon 6 or nylon 6/6, and a filler of a finely divided metal, such as copper, bronze or tungsten. In the preferred compositions, Nylon is incorporated in an amount of 8% or 11% by weight. The filler material is present in essentially the remainder amount. Either one of the nylon 6/6 or nylon 6 is explained as being used in amounts of up to 20% by weight. Booth does not disclose using both nylon materials together in the same bullet.

U.S. Pat. No. 5,616,642 to West et al. discloses a bullet containing a high density powder, such as copper, tungsten, bismuth, ceramic or stainless steel, in an amount of at least 85%, dispersed in a polyester matrix, such as polybutylene terephthalate or polyethylene terephthalate.

U.S. Pat. No. 6,048,379 to Bray et al. discloses a bullet made of tungsten, a fiber, such as stainless steel, copper, aluminum, nylon, Kevlar, Spectra, nickel, glass or carbon, and a binder material, such as nylon 12 or a polyester elastomer. Bray et al. indicate nylon 6/6 and nylon 6 are resins that are not suitable as binders. See column 10, lines 18–19.

U.S. Pat. No. 6,257,149 to Cesaroni discloses a bullet having a core made of a polymer, such as ethylene/methacrylic acid copolymer ionomers, polyetherester elastomers or polyamides, such as nylon 11 or nylon 12, and a jacket made of copper, nylon 6/6, nylon 6/12, nylon 4/12, flexible nylon, nylon 6 or nylon 11.

U.S. Pat. No. 6,845,716 to Husseini et al. discloses an article 21 of ammunition including a molded plastic cartridge casing body 23 having a first end 25 and a second end 27. A projectile 29 is attached to the first end 25 of the cartridge casing body 23 while a base 45 is attached to the second end 27 of the cartridge casing body 23. Husseini teaches it is known to manufacture the base 45 from a metal material, such as brass. The base 45 can also be manufactured from a plastic material that is molded out of a long fiber reinforced nylon material to provide stiffness, high compressive strength, and minimal cold flow. As such, the base 45 can be manufactured from brass, plastic, ceramic, or a combination of plastics, ceramics, and the like. See the paragraph bridging columns 5–6 in Husseini. Husseini also discloses a base 131 that includes a ceramic liner 131l with a composite or plastic material 131m molded over the liner 131l. See FIG. 18B of Husseini.

However, the base 45, 131 disclosed by Husseini, like the bases taught by the other conventionally known articles of ammunition, does not include a metallic cap defining the primer pocket and flash hole, wherein a polymer based plug is molded over the cap to provide the required resistance to internal chamber pressures that are experienced when the ammunition is fired, but also significantly reduce the overall weight of the cartridge case body relative to conventional brass cartridge cases.

As stated above, the test for all methods of holding the bullet within a cartridge case is commonly known as bullet pull. The Sporting Arms and Ammunition Manufactures Institute (hereinafter referred to as "S.A.A.M.I.") established a bullet pull for all calibers that creates a desired pressure to deliver the desired ballistics. The United States Military has also established bullet pull specifications that achieve the products desired ballistic performance.

SUMMARY OF THE INVENTION

It is an aspect of the present invention to provide a bullet, a cartridge case, and method of manufacturing the same that overcome the drawbacks of the conventional brass or lead bullets, cartridge case, and laborious, yet required, methods of manufacturing given the material compositions of the same.

In particular, it is an aspect of the present invention to provide a lead free, composite polymeric bullet and cartridge case having base with an over-molded metallic a metallic cup that is joined to a sleeve thus forming molded over by a polymer based plug, and method of manufacturing the same by injection molding requiring one or two steps, dependent on the cartridge caliber, to manufacture the cartridge case as opposed to the twenty three steps commonly needed to prepare the conventional brass cartridge cases. Furthermore, the present invention also manufactures bullets in a single step by injection molding, as opposed to as many as six (6) steps needed to manufacture the conventional lead based bullets.

BRIEF DESCRIPTION OF THE DRAWINGS

Other aspects and features of the present invention will be better understood from the following description, with reference to the accompanying drawings, wherein:

FIG. 12 is a table of a ballistic chart;

FIGS. 13A–C illustrate a method for producing an all-polymer injection molded cartridge case;

FIGS. 14A–C illustrate a cartridge case body according to a third embodiment of the present invention, wherein FIG. 14A is a perspective view of the cartridge case body; FIG. 14B is a side view of the cartridge case body, and FIG. 14C is a cross-sectional view of the cartridge case body;

FIGS. 15A–C illustrate a base of the cartridge case body illustrated in FIGS. 14A–C, wherein FIG. 15A is a perspective view of the base, FIG. 15B is a side view of the base, and FIG. 15C is a cross-sectional view of the base;

FIGS. 16A–C illustrate the metal cup of the base illustrated in FIGS. 15A–C, wherein FIG. 16A is a perspective view of the cup, FIG. 16B is a side view of the cup, and FIG. 16C is a cross-sectional view of the cup; and FIGS. 17A–D illustrate a sleeve of the cartridge case body illustrated in FIGS. 14A–C, wherein FIG. 17A is a perspective view of the sleeve, FIG. 17B is a side view of the sleeve, FIG. 17C is a cross-sectional view of the sleeve, and FIG. 17d is an enlarged view of the ammunition locking lip defined within the main cartridge case holding chamber defined by the sleeve.

DETAILED DESCRIPTION OF PREFERRED EMBODIMENTS

The present invention provides a cartridge case body strong enough to withstand gas pressures that equal or surpass the strength of brass cartridge cases under certain conditions. The cartridge case body includes a sleeve joined together with a base. While the sleeve is manufactured from a polymer based material, the base includes a metallic cup molded over by a polymer based plug. Furthermore, the present invention provides a lead free, composite polymer based article of ammunition having a specific gravity high enough to perform as well as if not better than conventional lead based ammunition.

Figure 1:
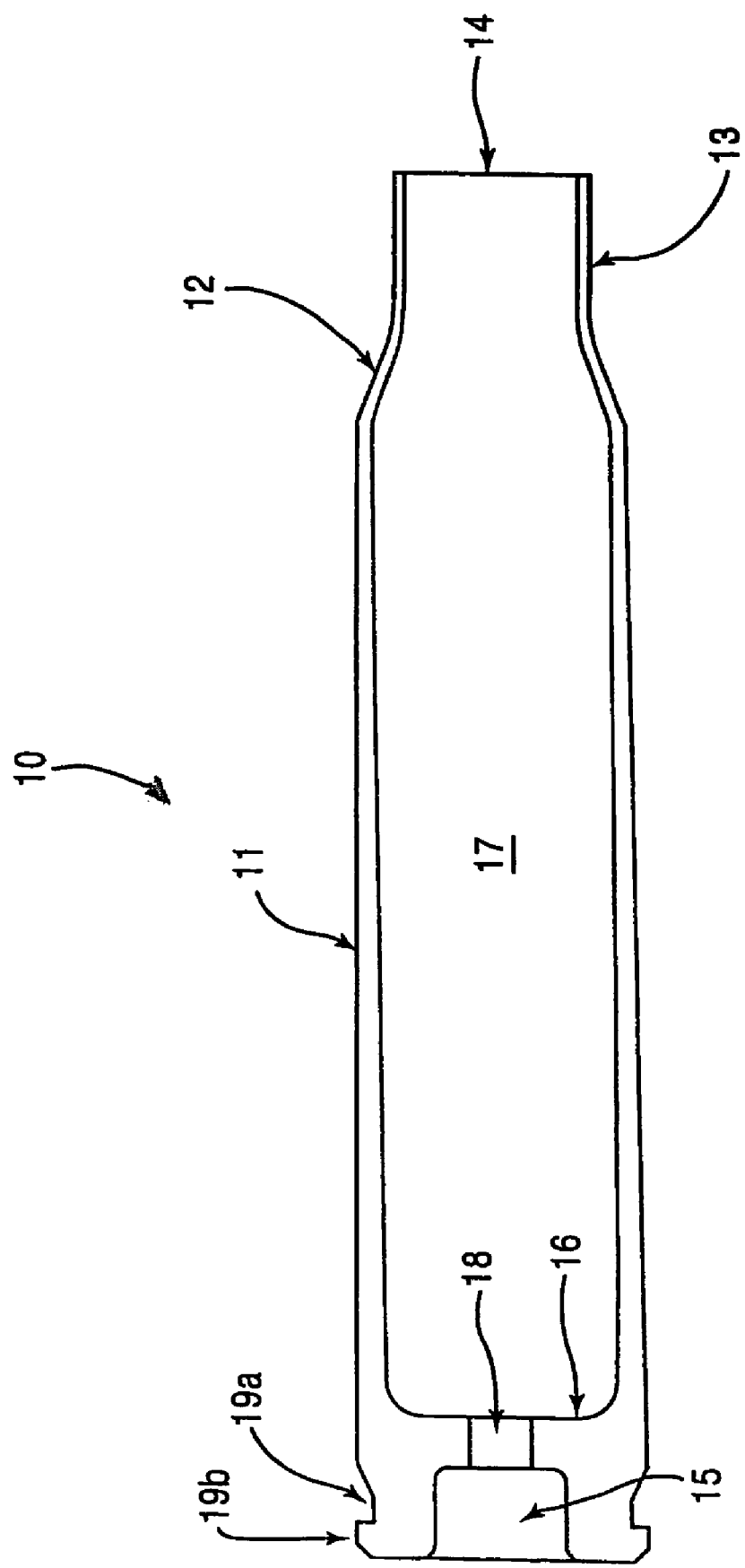
FIG. 1 is a cross sectional view of a conventional bottleneck cartridge case used with rifles.
Figure 2:
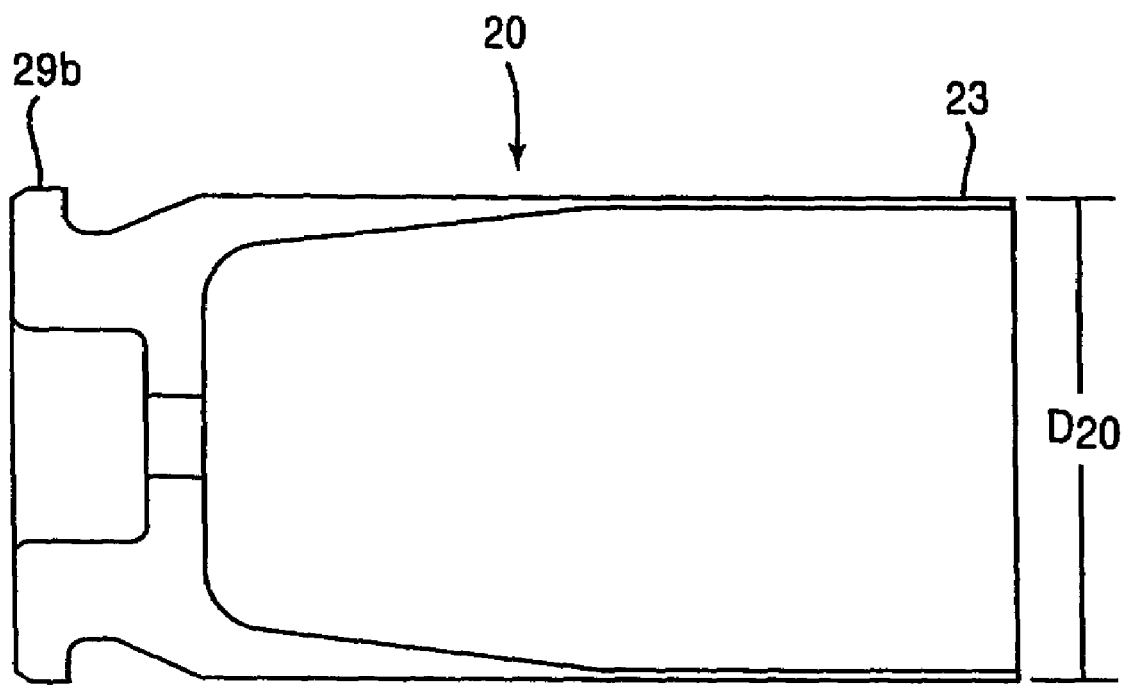
FIG. 2 is a cross sectional view of a straight walled rimless cartridge case used with pistols.
Figure 3A:
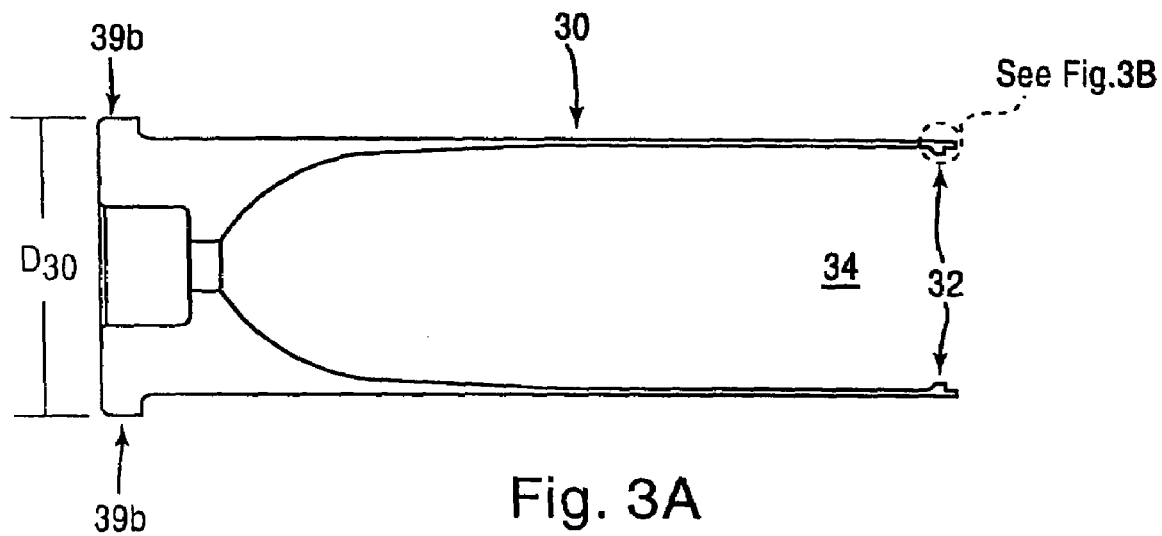
FIG. 3A is a cross sectional view of a tapered straight walled cartridge case having a rim and used with revolvers.
Figure 3B:
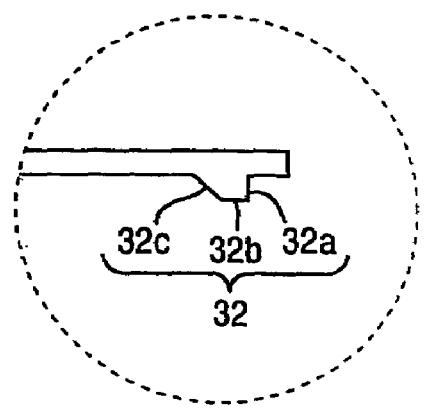
FIG. 3B is an enlarged view of a lip lock provided near a mouth of the cartridge case illustrated in FIG. 3.
Figure 4:
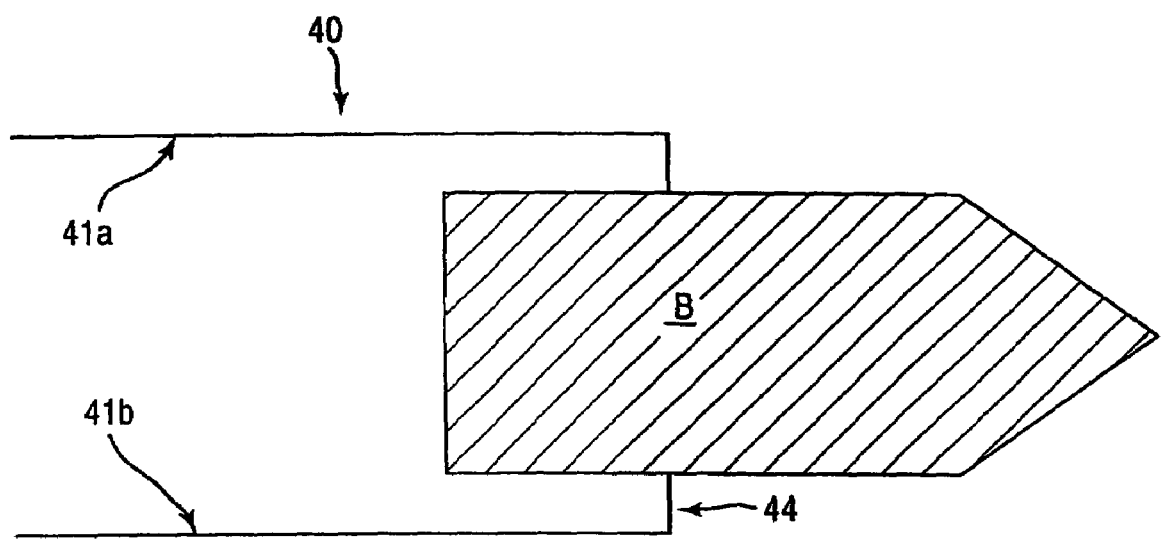
FIG. 4 is a schematic diagram illustrating how a conventional cartridge case is bent in the mouth region to hold the bullet therein.
Figure 5:
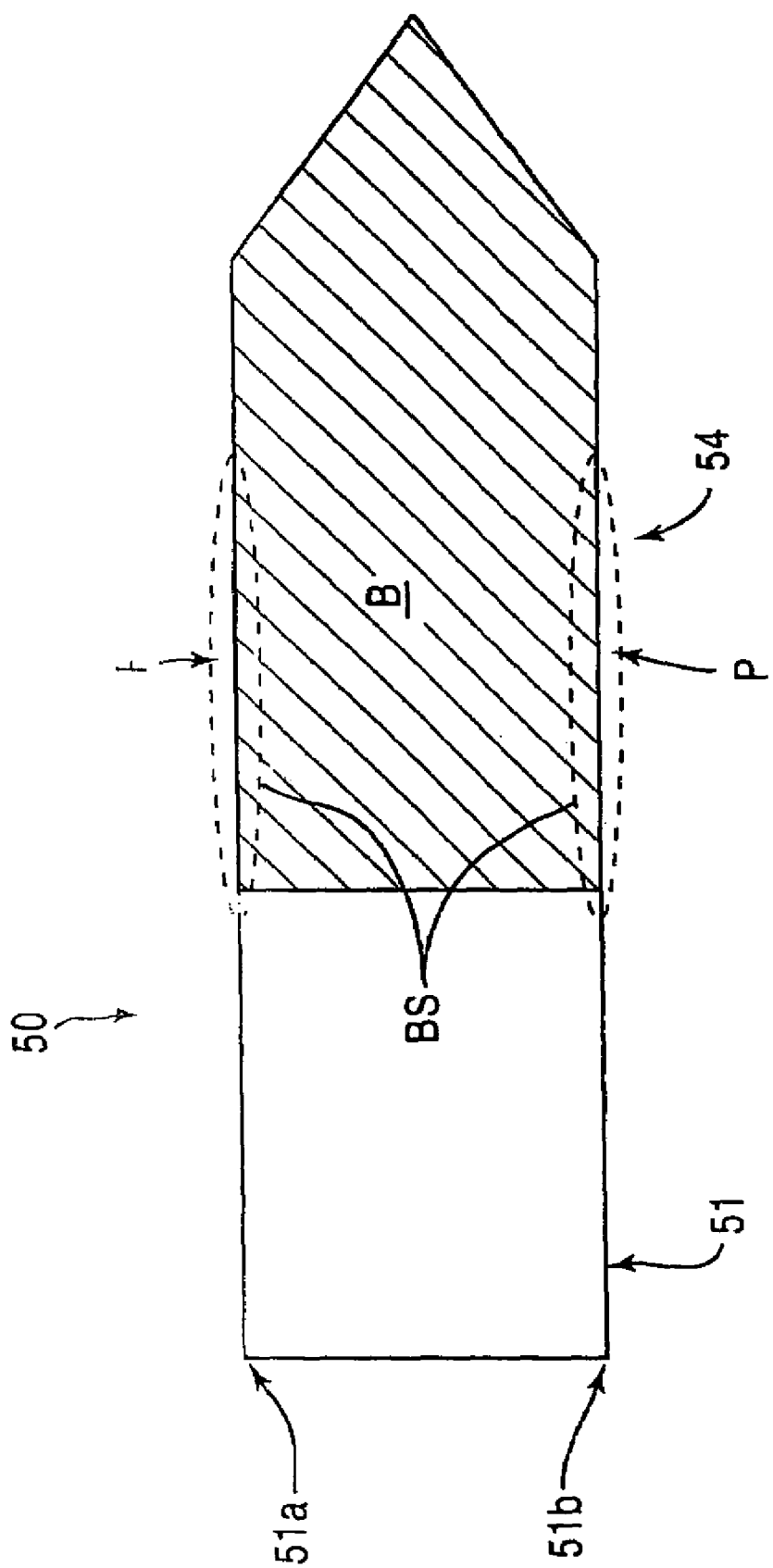
FIG. 5 is a schematic diagram illustrating how a conventional cartridge case is tapered from the base of the case to the mouth region to press fit the case onto the bullet.
Figure 6:
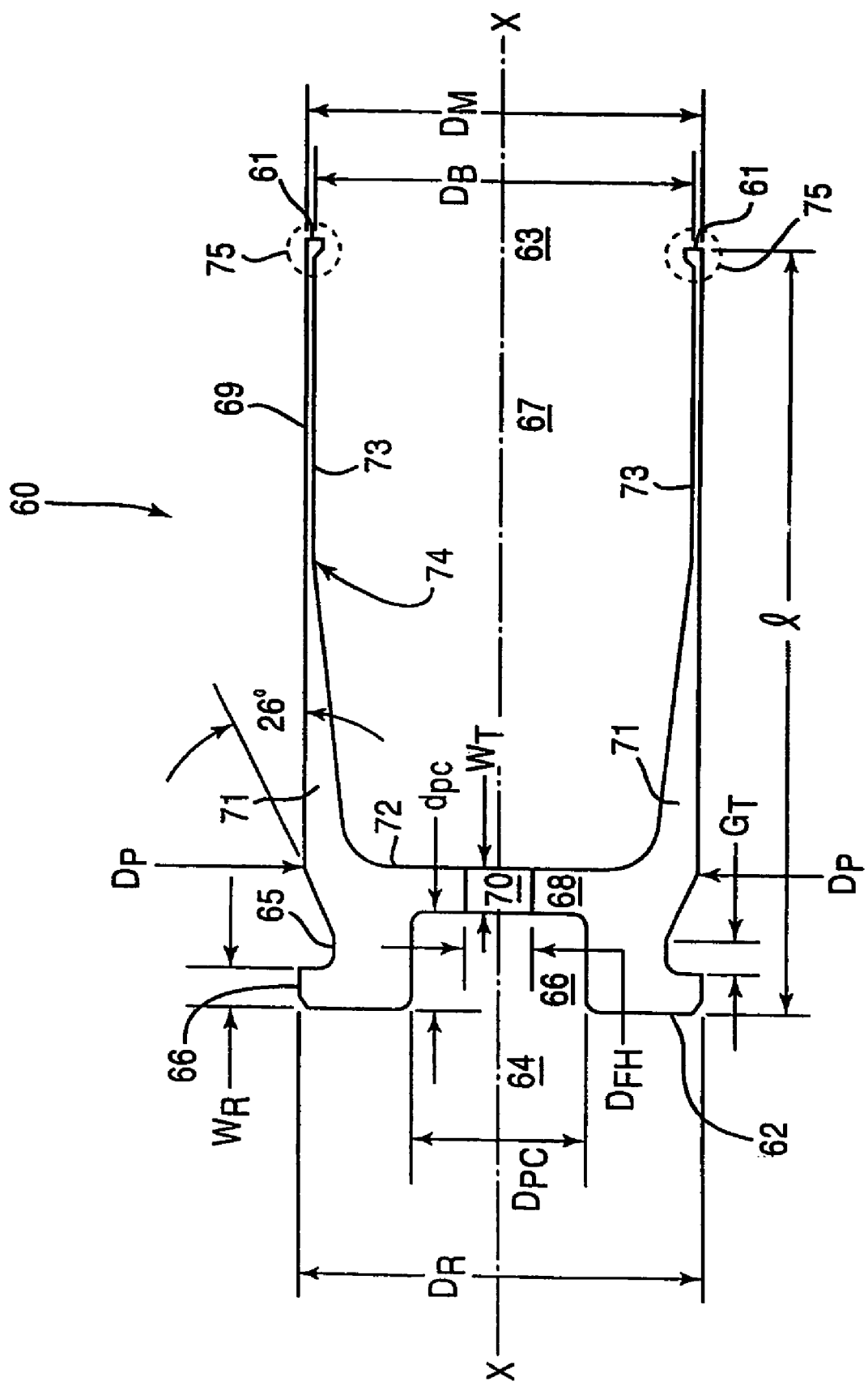
FIG. 6 is a cross sectional view of a cartridge case according to a first embodiment of the present invention.

FIG. 6 illustrates a first embodiment of the invention. In particular, a cartridge case 60 for holding .45 caliber ammunition therein is shown. The cartridge case satisfies S.A.A.M.I. requirements for .45 caliber ammunition.

For example, the cartridge case 60 has a front end that holds the ammunition (not shown) and a rear end that holds the primer. A length I of the cartridge case 60 from a front end face 61 to a rear end face 62 ranges from about 0.888 in. to 0.898 in., and preferably is about 0.894 in. An outer diameter $D_M$ of the cartridge case 60 at a mouth 63 is about 0.467 in. to 0.473 in., and preferably is about 0.470 in. and an outer diameter $D_P$ at a rear end 64 of the cartridge case 60 is about 0.469 in. to 0.476 in. and preferably is about 0.471 in.

The rear end 64 of the cartridge case 60 has a groove 65 formed therein with a thickness $G_T$ that ranges from about 0.036 in. to 0.39 in., and preferably is about 0.38 in. and a depth $G_D$ that ranges from about 0.037 in. to 0.043 in., and preferably is about 0.040 in. (see FIG. 8) The groove 65 defines a rim 66 at the most rearward point of the cartridge case 60, wherein the rim 66 has an outer diameter $D_R$ that ranges between about 0.470 in. and 0.476 in., and preferably is about 0.474 in. and a width $W_R$ that ranges between about 0.039 in. and 0.049 in., and preferably is about 0.045 in.

Radially inward relative to the groove 65 is a primer holding chamber 66, which has an outer diameter $D_{PC}$ that ranges from about 0.203 in. to 0.210 in., and is preferably about 0.207 in. and a depth dpc that ranges from about 0.115 in. to 0.120 in., and preferably is about 0.117 in.

An ammunition holding chamber 67 and the primer holding chamber 66 define a web 68 in the portion of a cartridge case body 69 therebetween, wherein the web 68 has a thickness $W_T$ that ranges between about 0.047 in. and 0.100 in., and preferably is about 0.050 in. The primer holding chamber 66 communicates with the ammunition holding chamber 67 via a flash hole 70 formed in the web 68, wherein the flash hole 70 has an outer diameter $D_{FH}$ that ranges between about 0.077 in. to 0.83 in., and preferably is about 0.80 in.

As shown in FIG. 6, the cartridge case 60 has a substantially cylindrical configuration with inner walls 71, 71 that taper from a rear end 72 of the ammunition chamber 67 toward the mouth 63 located at the front end of the chamber 67. The taper of the cartridge case inner walls 71, 71 transitions to walls 73, 73 that are parallel relative to a longitudinal axis x—x of the cartridge case 60. The transition occurs at a region of the case that is intermediate relative to the rear and front ends of the ammunition chamber 67 and is referred to as a blend point 74.

As shown in FIG. 6, a lip lock 75 is located at the most forward point of the cartridge case body 69 to define the mouth 63 of the cartridge case 60. The lip lock 75 holds the (not shown) in the cartridge case 60.

Figure 7:
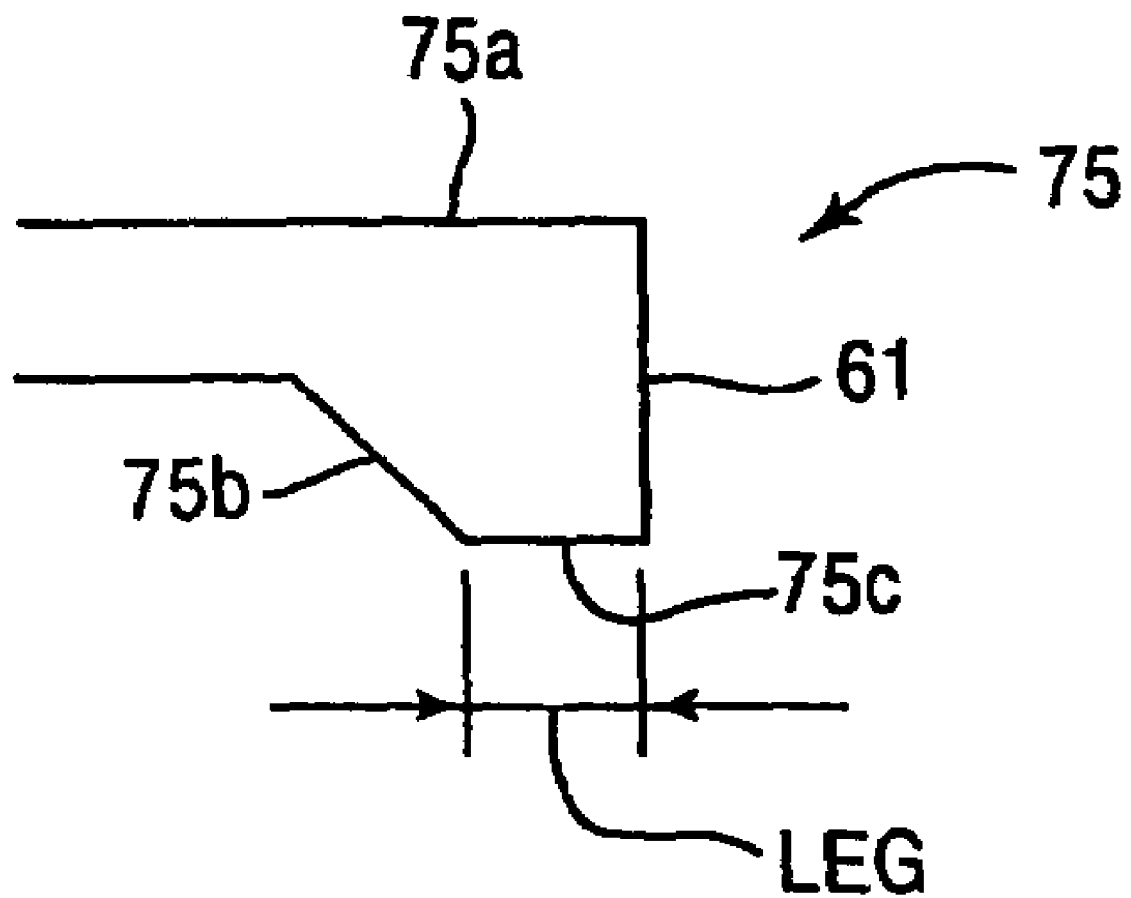
FIG. 7 is an enlarged view of the lip lock of the cartridge case shown in FIG. 6.

FIG. 7 shows an enlarged view of the lip lock 75, which has a base portion 75a that coincides with the outer surface of the cartridge case and is about 0.010 in. to 0.030 in. in length, and preferably is about 0.020 in. in length. The lip lock 75 has a unique configuration which is variable from an asymmetrical shape having a tapered rearward portion (as shown) to various symmetrical configurations depending on the desired ammunition holding requirements. A taper portion 75b of the lip lock 75 has a thickness that is about 0.010 in. and a width that ranges from about 0.020 in. at the widest portion to a width that corresponds to the length of the engaging portion. An engaging portion 75c of the lip lock 75 has a length leg ranging from about 0.008 in. to 0.012 in., and preferably is about 0.010 in.

It should be noted that the engaging portion 75c of the lip lock 75 should have a length leg that does not exceed the overall width of a cannelure formed in the ammunition (not shown), which will be described below, such that the engaging portion 75c of the lip lock 75 is able to fit within the ammunition lip lock cannelure. Furthermore, although not required, it is preferable that the base portion 75a of the lip lock 75 is parallel relative to the engaging portion 75c, but it is within the scope of this invention to arrange the engaging portion 75c to be oblique relative to the base portion 75a.

The cartridge case 60 and ammunition are manufactured by an injection molding process from a composite polymer by feeding the polymer through an injection molding apparatus. Because the cartridge case 60 is manufactured from a composite polymer, the walls of the cartridge case 60 from the mouth 63 to the blend 74 are able to be bent either radially inward toward the longitudinal axis x—x of the case or radially outward away from the longitudinal axis x—x. The flexibility of the case walls permit the mouth 63 to be temporarily expanded to receive the corresponding bullet, which is also manufactured from a composite polymer that may or may not be the same as the composite polymer used to manufacture the cartridge case. Properly prepared with the correct corresponding groove, conventional lead or jacketed bullets can be used with the polymer cartridge case design described herein.

Once the mouth 63 is expanded, the corresponding ammunition B is inserted therein. It should be noted that the ammunition B has an outer diameter $D_B$ that ranges between 0.450 in. to 0.453 in., and preferably is 0.451 in. (see FIG. 6) Furthermore, the ammunition B (FIG. 8) has a cannelure 80 formed on an outer circumferential surface at a location that permits the engaging portion 75c of the lip lock 75 to be inserted therein and wherein the ammunition B is not inserted beyond the blend 74 on the inner walls 71, 71 of the case body 69.

Accordingly, the ammunition is inserted into the ammunition holding chamber 67 of the cartridge case 60 by slightly expanding the mouth 63 until the ammunition cannelure 80 coincides with the engaging portion 75c of the lip lock 75. The lip lock 75 is then permitted to snap back to an original position wherein the engaging portion 75c of the lip lock 75 matingly engages the cannelure 80 of the ammunition B. See FIG. 8. The lip lock 75 provides enough resistance to provide the required ammunition pull value of approximately 5 to 20 pounds, which is greatly reduced from conventional ammunition pull values for brass cartridge cases, which are approximately 35 to 65 pounds. U.S. Military Specifications require a higher ammunition pull in some cases to assure that certain Legacy Weapons Systems will fully function properly. In these cases, the ammunition pull of this invention can be increased to accommodate any U.S. Military Weapon Systems.

The lip lock 75 also prevents creeping of the bullet. Creep occurs when a ammunition moves forward in its case due to recoil generated by the firing of adjacent cartridges. In a semi-automatic pistol, creep can cause cartridges to jam in the magazine and/or prevent proper feeding into the chamber due to excessive overall length, which would render the pistol inoperable.

Figure 8:
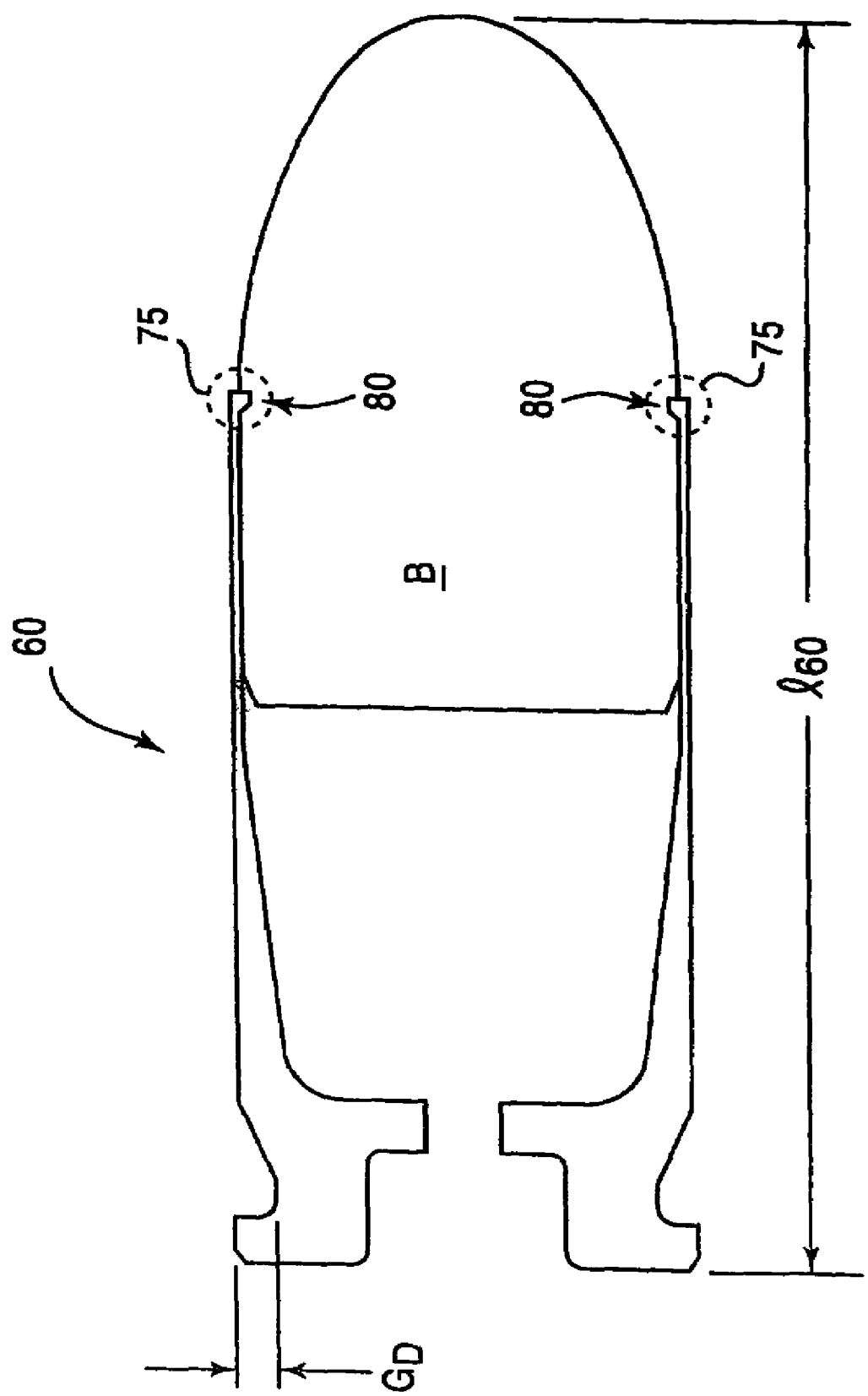
FIG. 8 is a cross sectional view of the cartridge case shown in FIG. 6 holding a corresponding caliber bullet.

As shown in FIG. 8, the overall length 160 of the cartridge case 60 and ammunition B held therein ranges from about 1.190 in. to 1.270 in. and is preferably about 1.263 in. in length. Furthermore, when the firearm is fired, the lip lock 75 permits the smooth release of the ammunition B, which enhances the accuracy of the firearm.

Figure 9:
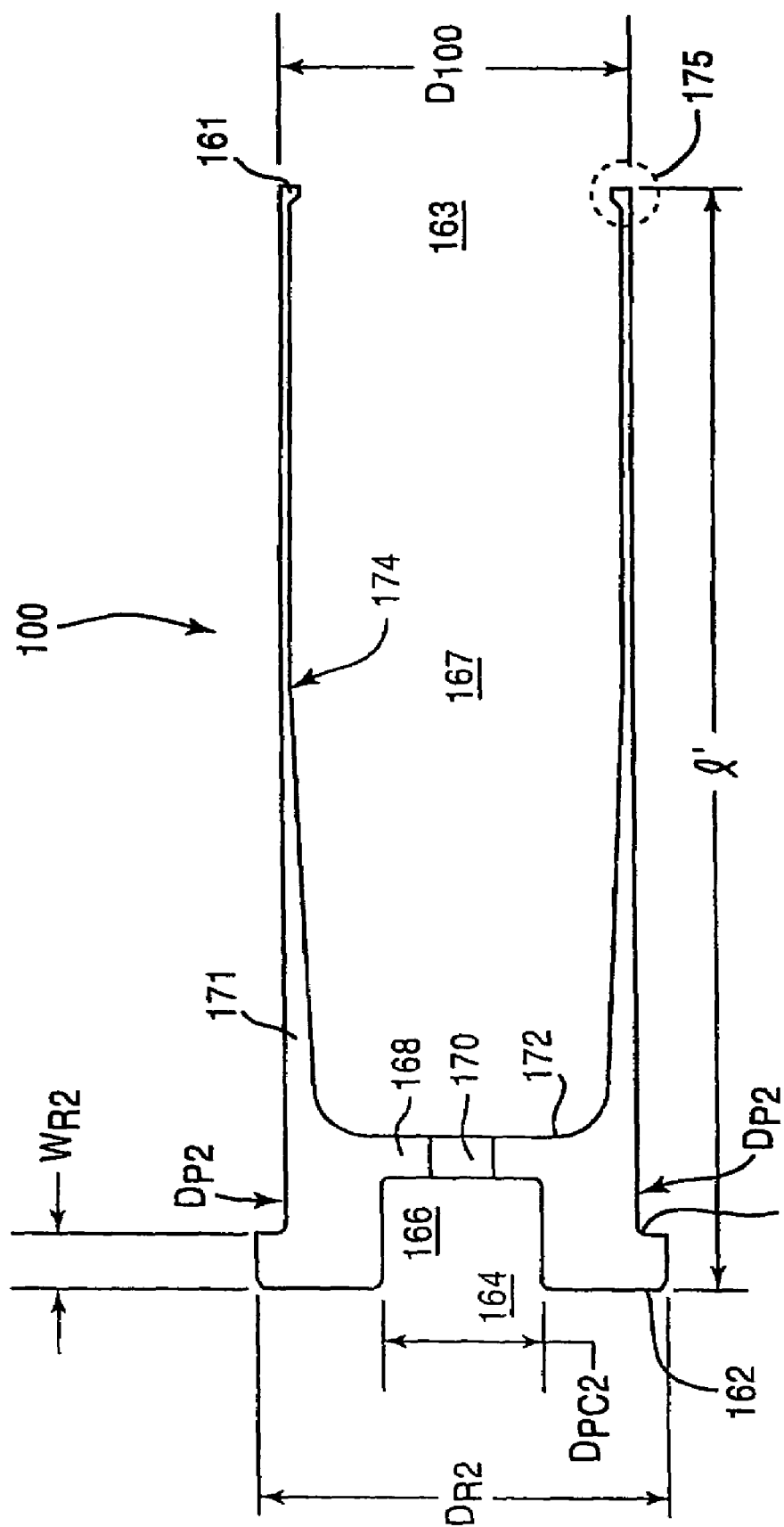
FIG. 9 is a cross sectional view of a cartridge case according to a second embodiment of the present invention.
Figure 10:
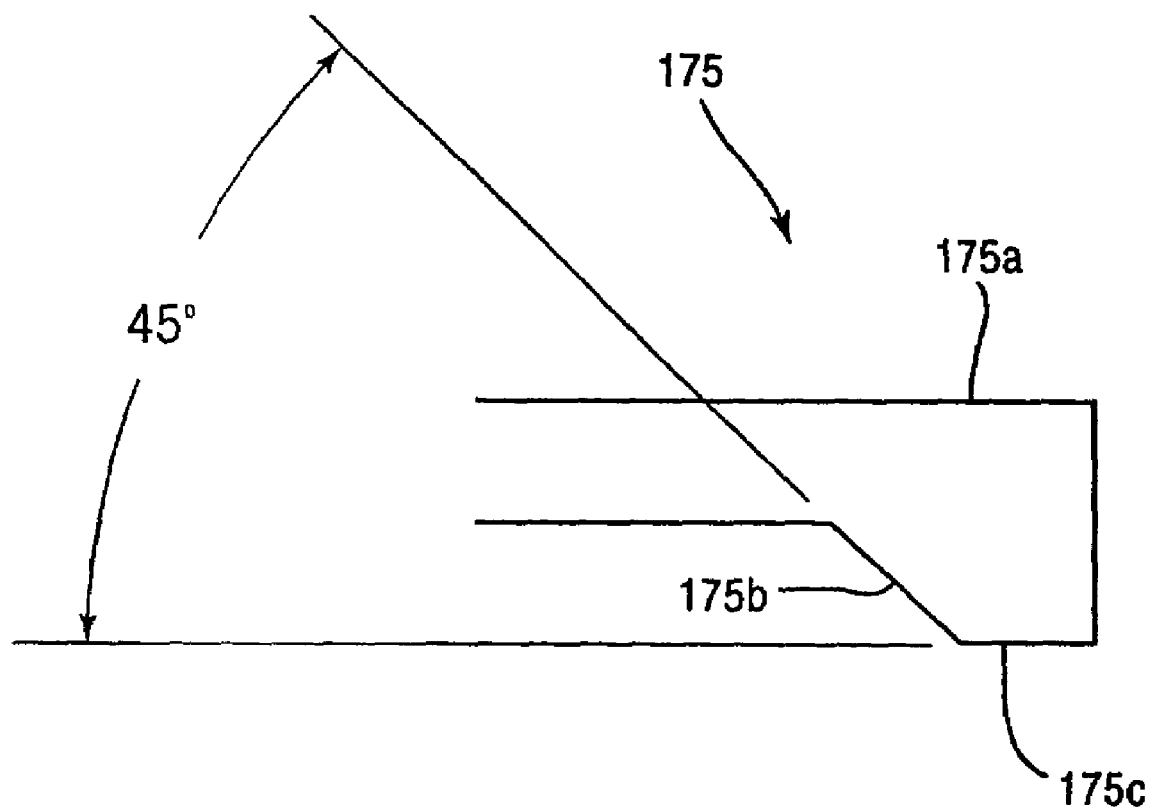
FIG. 10 is a an enlarged view of the lip lock of the cartridge case shown in FIG. 9.
Figure 11:
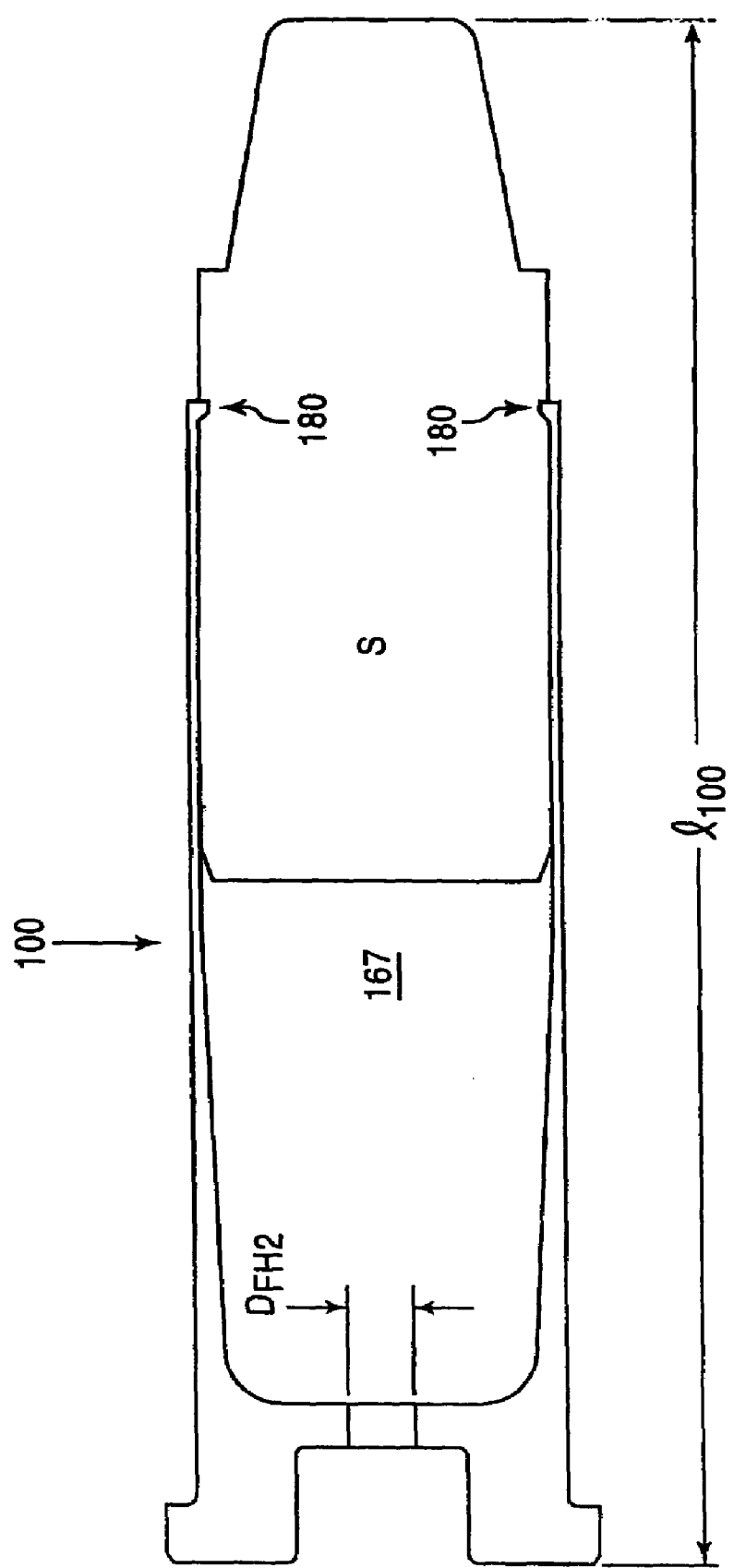
FIG. 11 is a cross sectional view of the cartridge case shown in FIG. 9 holding a corresponding caliber bullet.

The present invention is not limited to the above-described caliber and is believed to be applicable to other calibers as well. For example, FIGS. 9–11 show a second embodiment of the invention, and in particular, a cartridge case 100 for holding a 38 special caliber bullet. The cartridge case 100 satisfies S.A.A.M.I. requirements for 38 special caliber ammunition.

A length l' of the cartridge case 100 from a front end face 161 to a rear end face 162 ranges from about 1.135 in. to 1.155 in., and preferably is about 1.154 in. An outer diameter $D_{100}$ of the cartridge case 100 at a mouth 163 is about 0.372 in. to 0.379 in., and preferably is about 0.374 in. and an outer diameter $D_{P2}$ at a primer end is about 0.372 in. to 0.376 in. and preferably is about 0.374 in.

A rear end 164 of the cartridge case 100 has a rim 166 formed thereon, wherein the rim 166 has an outer diameter $D_{R2}$ that ranges between about 0.428 in. and 0.440 in., and preferably is about 0.433 in. and a width $W_{R2}$ that ranges between about 0.048 in. and 0.059 in., and preferably is about 0.056 in.

Radially inward relative to a groove 165 is a primer holding chamber 166, which has an outer diameter $D_{PC2}$ that ranges from about 0.168 in. to 0.175 in., and is preferably about 0.171 in. and a depth that ranges from about 0.115 in. to 0.120 in., and preferably is about 0.117 in.

An ammunition holding chamber 167 and the primer holding chamber 166 define a web 168 in the portion of the cartridge case body therebetween, wherein the web 168 has a thickness that ranges between about 0.047 in. and 0.100 in., and preferably is about 0.050 in. The primer holding chamber 166 communicates with the ammunition holding chamber 167 via a flash hole 170 formed in the web 168. The flash hole 170 has an outer diameter $D_{FH2}$ that ranges between about 0.077 in. to 0.83 in., and preferably is about 0.80 in. (see FIG. 11)

As shown in FIG. 9, the cartridge case 100 has a substantially cylindrical configuration with inner walls 171 that taper from a rear end 172 of the ammunition holding chamber 167 toward the mouth 163 located at the front end of the case. The taper of the cartridge case inner walls 171 transitions to walls that are parallel relative to the longitudinal axis of the cartridge case 100. The transition occurs at a region of the case intermediate relative to the rear end 172 and mouth 163 of the case 100 and is referred to as a blend point 174.

As shown in FIG. 9, a lip lock 175 is located at the most forward point of the cartridge case body and defines the mouth 163 of the cartridge case 100. The lip lock 175 holds the bullets in the cartridge case 100. The lip lock 175 also prevents creeping of the bullets. Creep occurs when the ammunition S moves forward in the case 100 due to recoil caused by firing of adjacent cartridges. In a revolver, creep will allow the ammunition to protrude out of the cylinder, preventing its rotation (causing a jam), thus rendering the firearm inoperable.

FIG. 10 shows an enlarged view of the lip lock 175, which has a base portion 175a that coincides with the outer surface of the cartridge case 100 and is about 0.018 in. to 0.022 in. in length, and preferably is about 0.020 in. in length. The lip lock 175 has a taper portion 175b that tapers from the base portion 175a to an engaging portion 175c, wherein the taper portion 175b has a thickness that is about 0.010 in. and a width that ranges from about 0.020 in. at the widest portion to a width that corresponds to the length of the engaging portion 175c. The engaging portion 175c has a length ranging from about 0.008 in. to 0.012 in., and preferably is about 0.010 in.

Once the mouth 163 is expanded, the corresponding ammunition S is inserted therein. It should be noted that the ammunition S has an outer diameter that ranges between about 0.355 in. to 0.359 in., and preferably is about 0.357 in. Furthermore, the ammunition S has a cannelure 180 formed on an outer circumferential surface at a location that permits the engaging portion 175c of the lip lock 175 to be inserted therein.

Accordingly, the ammunition S is inserted into the ammunition holding chamber 167 until the ammunition cannelure 180 coincides with the engaging portion 175c of the lip lock 175. The lip lock 175 is then permitted to snap back to an original position wherein the engaging portion 175c of the lip lock 175 matingly engages the ammunition cannelure 180. (See FIG. 11) The lip lock 175 provides enough resistance to provide an ammunition pull of about 5 to 20 pounds which is greatly reduced from conventional ammunition pull values for brass cartridge cases, which is about 35 pounds. An overall length $I_{100}$ of the cartridge case 100 and ammunition S held therein ranges from about 1.400 in. to 1.550 in. and is preferably about 1.531 in. in length. Furthermore, when the firearm is fired, the lip lock 175 permits the smooth release of the ammunition S, which enhances the accuracy of the firearm.

As stated above, the cartridge case and ammunition are manufactured by feeding a composite polymer through an injection molding machine into molds configured to the particular geometric shapes of the case and caliber of bullet, respectively. In other words, the entire and complete cartridge case is manufactured or molded in a single operation. Furthermore, the entire and complete ammunition is manufactured or molded in a single operation. The dimensions for the molds are selected to allow the proper shrinkage of the composite polymer material to achieve the desired specifications and/or caliber. As shown in the table of FIG. 12, the cartridge case is strong enough to provide the same pressure retention benefits as brass cartridge cases, and when the same propellant is used, the lead free, composite polymer cartridge case of the present invention delivers the same velocities as brass cartridge cases, but at a substantially lower pressure curve. Also, as stated above, compared to conventional brass case cartridges, the lead free, composite polymer cartridge case of the present invention provides ammunition pull values that are 700% to 1400% less.

A first embodiment of the lead free, composite polymer material is suitable for the bullet. The polymer material includes, by weight, a tungsten metal powder in the range of about 50–96%, preferably about 60–95%, and most preferably about 70–90%, of the overall composition of the polymer material. It is most suitable that the tungsten metal powder be present in at least 70% by weight. The polymer material also includes about 0.5–15%, preferably about 1–12%, and most preferably about 2–9% by weight, of nylon 6/6, about 0.5–15%, preferably about 1–12%, and most preferably about 2–9% by weight, of nylon 6, and about 0.5–15%, preferably about 1–12%, and most preferably about 2–9% by weight, of glass fibers. It is most suitable that each of these ingredients be included in amounts less than 10% by weight.

The polymer material according to the first embodiment preferably has a specific gravity of 3–10, more preferably 6–9, and most preferably 7.5–8.5. Preferably, the polymer material has a specific gravity which permits the molded ammunition to provide a user with a point of aim that is comparable to that of the conventional lead products. An ammunition formed in accordance with the present invention is environmentally friendly as it does not have any lead, performs ballistically similar to conventional bullets, has a lower weight while using the same firearm hold characteristics, and can be produced at a substantially lower manufacturing cost. Furthermore, the composite polymer material of the first embodiment preferably encapsulates the tungsten powder such that the composite polymer ammunition does not wear down the barrel of the firearm, which results in a longer life for the firearm.

The properties of the selected polymer material provide several advantages over the conventionally used brass and lead materials used for cartridge cases and bullets, respectively. For example, the polymer material provides a way for the cartridge case to hold the ammunition that replaces crimping and eliminates a need to use adhesives in cases where adhesives are required to provide the proper ammunition pull properties when using brass cases. The unique lip lock design permits the cartridge case to be snapped into the corresponding cannelure of the bullet.

Brass cartridge cases tend to form to the chamber walls when fired. In contrast, the composite polymer cartridge case of the present invention flexes during firing, but the material memory returns the cartridge case to its original dimensions. Accordingly, the combination of the composite polymer material returning to its original dimension after firing, the lubricity of the polymer aid extraction in contrast to brass, which ultimately inhibits extraction.

FIGS. 13A–C illustrate a method for producing an all-polymer, injection molded bottleneck cartridge case 200, wherein FIG. 13A illustrates a base 210, FIG. 13B illustrates a case 230, and FIG. 13C illustrates the case 200 after assembly. The bottleneck shaped case is produced by molding two separate parts, i.e., a case body 231 having a bottleneck configuration, and a base 210. The base 210 includes a rim 211 defining an extractor groove 212 having a ramp 213. A web 214 defines a flash hole 215 therethrough, wherein the flash hole 215 leads to a primer holding chamber 216.

The base 210 and case 230 are welded together in a secondary production operation. In order to achieve a strong weld, the base 210 and case 230 must have a weld joint profile 216 and 232, respectively, molded into each of the two parts. The weld joint profiles are designed to accommodate a welding process, which can include ultrasonic, spin or laser welding. The welding procedure will be dictated by the choice of polymer material for the cartridge being manufactured. An important design feature of the base 210 is the thickness of the web 214. In some types of firearms, the chamber does not fully support the base end of the cartridge case. In order to maximize the strength of the base in this area, the flash hole channel of the present invention can be extended by making the web 214 relatively wider. Consequently, such a design allows the explosive force of the primer and gunpowder ignition to take place in the area of the chamber where the case is fully supported.

FIGS. 14A–17D illustrate a cartridge case body according to a third embodiment of the present invention, which is described below. Features and methods of manufacture of the third embodiment that are similar to the features and methods described above with respect to the first two embodiments are omitted herefrom to avoid redundancy as such features are readily understood by one of ordinary skill in the art.

Figure 14A:
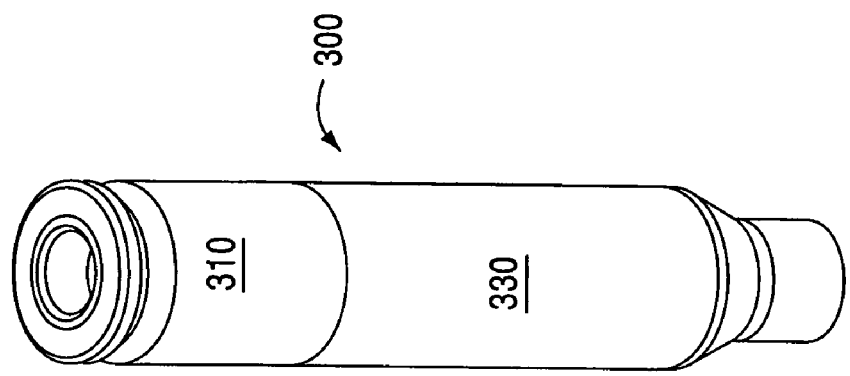
Figure 14C:
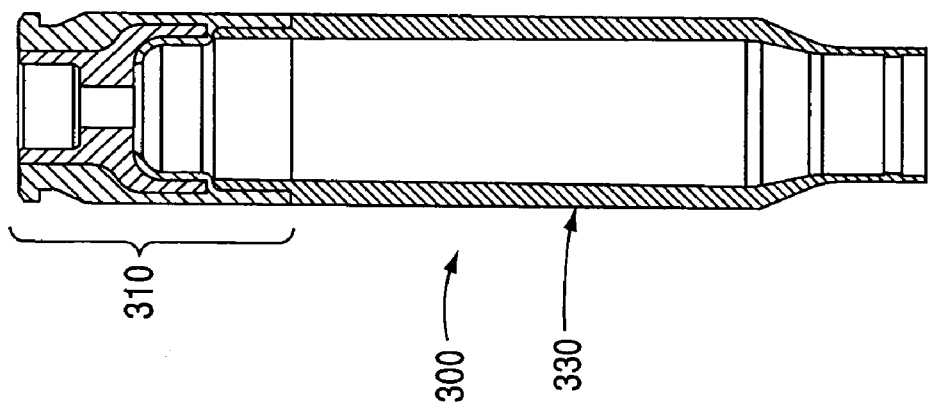
Figure 14B:
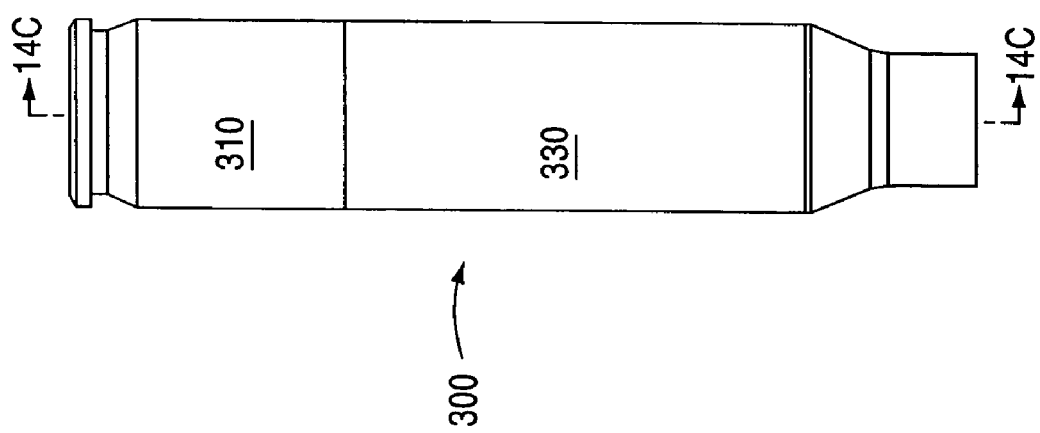

Referring to FIGS. 14A–C, the bottleneck cartridge case body 300 includes a base 310 and cylindrical sleeve 330 joined thereto. Preferably, the sleeve 330 is formed from a polymer material or a composite material.

As shown in FIGS. 17A–D, the sleeve 330 includes a first end 331 which holds the article of ammunition (not shown) and a second end 371 opposite the first end 331. The first end 331 has a mouth 314 through which the ammunition extends and a neck 315 that includes an annular projectile locking lip 318 (see FIG. 17D) defined therein. The locking lip 318 securely holds the projectile (not shown) in the cartridge case 300. The sleeve 330 has a constant outer diameter at the neck 315, but increases after transitioning at a shoulder portion 320 to a main cartridge case holding chamber 337.

As clearly shown in FIG. 17C, the main cartridge case holding chamber 337 portion of the sleeve 330 has a constant inner diameter 337i from a point where the shoulder 320 completes the transition to the chamber 337. The inner diameter 337i of the chamber 337 is constant from the transition point to the second end 371 of the sleeve 330. However, the outer diameter 371o of the sleeve 330 at the second end 371 is smaller or less than an outer diameter 337o of the chamber 337 portion of the sleeve 330, i.e., 337o>371o. As explained in further detail below, the outer diameter 371o of the sleeve 330 at the second end 371 is less than the outer diameter 337o of the chamber 337 portion of the sleeve 330 to facilitate the sleeve 330 easily being nested within the base 310.

Figure 15A:
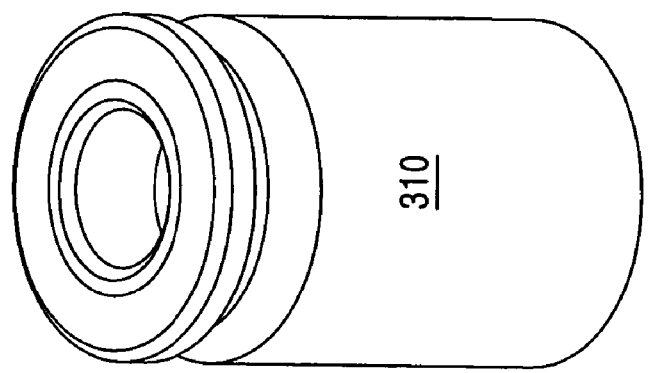
Figure 15C:
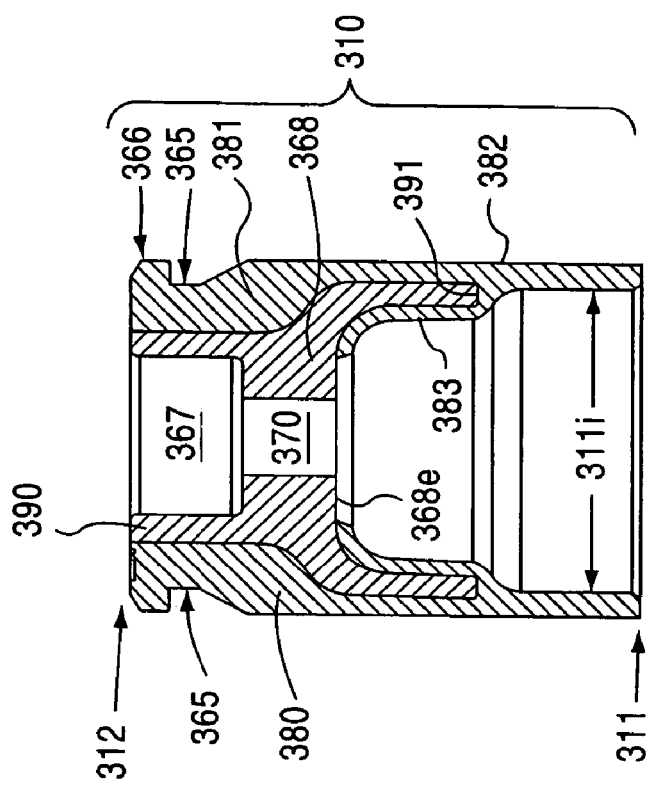
Figure 15B:
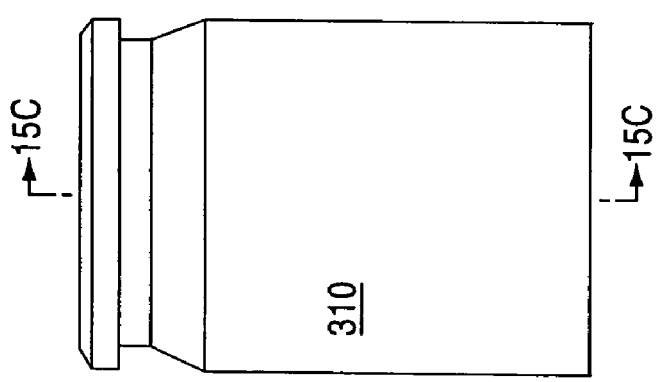

Referring to FIGS. 15A–C, the base 310, which is the portion of the cartridge case body 300 that holds the primer, includes a first end 311 and a second end 312 opposite the first end 311. The first end 311 is open and configured to receive the second end 371 of the sleeve 330. Moreover, an inner diameter 311i of the first end 311 is greater than the outer diameter 371o of the sleeve 330, i.e., 311i>371o, wherein the second end 371 of the sleeve 330 is slidingly engaged by the first end 311 of the base 310.

The second end 312 of the base 310 includes an annular groove 365 formed therein, wherein the groove 365 defines a rim 366 at the most rearward point of cartridge case body 300. A primer holding chamber or pocket 367 of the base 310 and the main cartridge case holding chamber 337 define a web 368 in the portion of the case body 300 therebetween. The primer pocket 367 communicates with the chamber 337 through a flash hole 370 formed in the web 368.

Figure 16A:
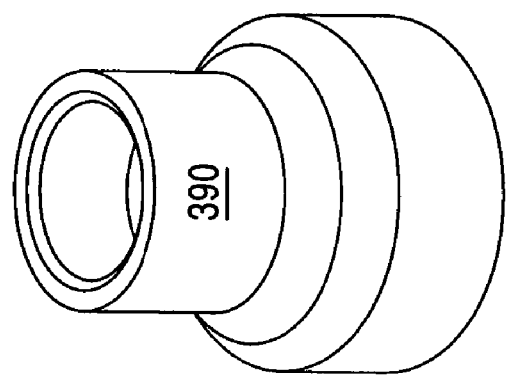
Figure 16C:
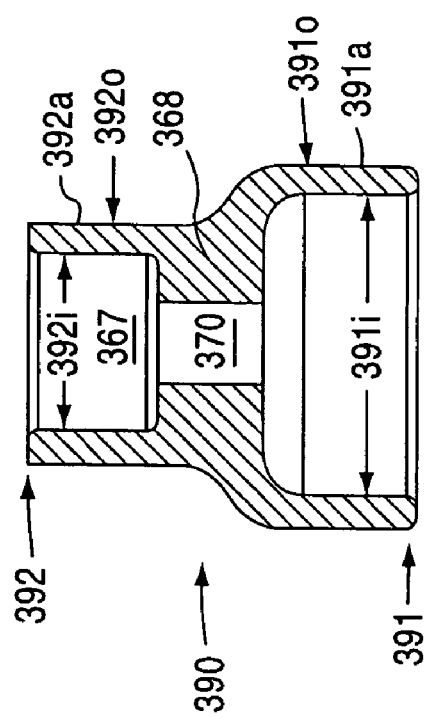
Figure 16B:
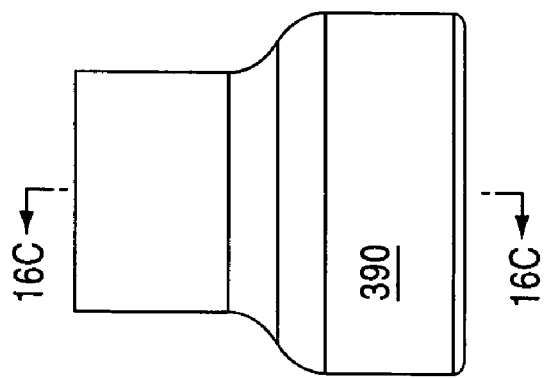

As shown in FIG. 15C, the base 310 includes a cup 390 over molded by a plug 380. Preferably, the cup 390 is manufactured from a metal or any suitable non-metal, i.e., an alloy and the like, while the plug 380 is manufactured from a suitable, injection-moldable polymer. Referring to FIGS. 16A–C, the cup 390 includes a first end 391 and a second end 392 opposite the first end 391. A first annular cup portion 391 extends from an end of the web 368 closer to the first end 311 of the base 310, while a second annular cup portion 392a extends from the web 368 in a direction that is opposite from the first annular cup portion 391a, that is, in a direction away from the first end 311 of the base 310.

Moreover, the inner diameter 391i of the first annular cup portion 391a is greater than the inner diameter 392i of the second annular cup portion 392, while the outer diameter 391o of the first annular cup portion 391a is also greater than the outer diameter 392o of the second annular cup portion 392, i.e., 391i>392i and 391o>392o. See FIG. 16C.

Returning to FIG. 15C, the plug 380 includes a first annular portion 381 that includes the rim 366 and groove 365 of the base 310 and extends from the first end 311 to the second end 312 thereof. A second annular portion 383 extends from a region 382 of the plug 380 that is located intermediate the first and second ends 311 and 312 of the base 310 corresponding to where the first end 391 of the cup 390 is closest to the first end 311 of the base 310. In other words, when the plug 380 is molded over the cup 390, such as, for example, during an injection molding process, the first annular portion 381 completely encompasses the outer circumferential surface of the cup 390 while the second annular portion 383 covers at least an entire inner surface of the first annular cup portion 391a and, optionally, a portion of an end face 368e of the web 368 that is closest to the first end 311 of the base 310 as well. Although not illustrated as such, it should be noted that it is within the scope of the present invention to extend the second annular portion 383 to cover the entire end face 368e of the web 368 except for the portion defining the flash hole 370.

Once the cup 390 has been manufactured from a metal or suitable non-metal, the plug 380 is over-molded the cup 390, preferably by injection molding, such that the first annular portion 381 completely encompasses the outer circumferential surface of the cup 390 and the second annular portion 383 covers at least the entire inner surface of the first annular cup portion 391a and, optionally, at least a portion or the end face 368e of the web 368, except for the portion defining the flash hole 370. Once assembly of the cup and plug 390, 380 portion of the base 310 is complete, the sleeve 330 is joined thereto by an adhesive or several well known welding processes, e.g., ultrasonic welding. Once the sleeve 330 and base 310 are joined, the finished cartridge case body 300 is primed and loaded in the same manner as conventional brass cases. It should be noted that when loaded, the projectile locking lip 318 of the sleeve 330 mechanically locks the projectile therein.

An advantage provided by the third embodiment of the present invention is that the cartridge case body 300 has a significantly lower weight compared to the weight of conventional brass cartridge cases. Another advantage is that the cartridge case body 300 is stronger and better suited to withstand and provide the same resistance to the internal chamber pressures experienced when the ammunition is fired than cartridge cases having bases that are entirely manufactured from a polymer.

Many modifications may be made to adapt the teachings of this invention to particular situations or materials without departing from the scope thereof. Therefore, this invention should not be limited to the particular embodiments disclosed herein, but includes all embodiments within the spirit and scope of the disclosure.

We claim:

1. A cup and plug base assembly of a lead-free cartridge case configured to hold a projectile that has a cannelure formed along an outer circumferential surface thereof, the cartridge case including a cylindrical sleeve joined to the base, the sleeve being manufactured from a composite polymer and has a front end and a rear end opposite the front end, a mouth is defined by the front end of the sleeve and the rear end of the sleeve has an outer diameter that is less than an outer diameter of a main cartridge case holding chamber located intermediate the front and rear ends of the sleeve, the base assembly comprising:

a cup having a web with a flash hole defined therein, a first annular cup portion extending in a first direction away from the web toward the sleeve and a second annular cup portion extending in a second direction away from the web and away from the sleeve in a direction opposite to the first direction in which the first annular cup portion extends; and a plug molded over the cup, the plug comprising a first annular portion extending from a first end of the base to a second end of the base and a second annular portion extending from the first annular portion and covers at least an entire inner surface of the first annular cup portion.

2. The base assembly according to claim 1, wherein the second annular portion of the plug extends from a region located intermediate the first and second ends of the base.

3. The base assembly according to claim 1, wherein the second annular portion of the plug extends in a direction from the first end of the base toward the second end of the base.

4. The base assembly according to claim 1, wherein the web extends radially inward relative to the body and is disposed intermediate the first and second ends of the base, the web separating the main holding chamber of the sleeve from a primer pocket defined in the second end of the base.

5. The base assembly according to claim 4, wherein the second annular portion of the plug covers at least a portion of an end face of the web facing the first end of the base.

6. The base assembly according to claim 4, wherein the main holding chamber of the sleeve communicates with the primer pocket of the base via the flash hole.

7. The base assembly according to claim 1, wherein an inner diameter of the plug at the first end of the base is greater than an outer diameter of the sleeve and the rear end thereof, and wherein the rear end of the sleeve is engaged by the plug.

8. The base assembly according to claim 1, wherein the cup is manufactured from one of a metal and a suitable non-metal and the plug is manufactured from polymer.

9. The base assembly according to claim 8, wherein the polymer may consist of additives and/or stabilizers.

10. The base assembly according to claim 1, wherein the front end of the sleeve also includes a neck having engaging means defined therein for engaging the cannelure formed along the outer circumferential surface of the projectile, and wherein a groove is formed along an outer circumferential surface of the base near the second end of the base.

11. The base assembly according to claim 10, wherein the engaging means is an annular projectile locking lip extending radially inward relative to an outer surface of the sleeve.

12. The base assembly according to claim 10, wherein the groove defines a rim extending radially outward away from the outer circumferential surface of the base.

13. The base assembly according to claim 1, wherein an inner diameter of the first annular cup portion is greater than an inner diameter of the second annular cup portion.

14. The base assembly according to claim 1, wherein the sleeve and base are joined together by one of an adhesive and a welding process.

\* \* \* \* \*